United States Patent
Kumano

(10) Patent No.: US 7,362,535 B2
(45) Date of Patent: Apr. 22, 2008

(54) MAGNETIC DISK DRIVE AND RECORDING METHOD

(75) Inventor: Toshifumi Kumano, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/408,540

(22) Filed: Apr. 20, 2006

(65) Prior Publication Data

US 2006/0238912 A1    Oct. 26, 2006

(30) Foreign Application Priority Data

Apr. 26, 2005    (JP)    ............................. 2005-128147

(51) Int. Cl.
*G11B 21/02*    (2006.01)
*G11B 15/04*    (2006.01)

(52) U.S. Cl. .......................................... 360/75; 360/60

(58) Field of Classification Search ..................... None
See application file for complete search history.

(56) References Cited

U.S. PATENT DOCUMENTS

| | | | | |
|---|---|---|---|---|
| 5,257,255 A * | 10/1993 | Morimoto et al. | ....... | 369/53.42 |
| 6,304,406 B1 * | 10/2001 | Douglas et al. | .......... | 360/73.03 |
| 6,327,120 B1 * | 12/2001 | Koganezawa et al. | ... | 360/294.4 |
| 6,351,341 B1 * | 2/2002 | Lee et al. | ....................... | 360/75 |
| 6,414,809 B1 * | 7/2002 | Sakai et al. | .................... | 360/60 |
| 6,594,213 B1 * | 7/2003 | Hayashi | .................... | 369/47.34 |
| 6,667,844 B1 * | 12/2003 | Yao et al. | ....................... | 360/75 |
| 6,795,262 B1 * | 9/2004 | Codilian et al. | .............. | 360/60 |
| 7,126,782 B2 * | 10/2006 | Koganezawa | ................. | 360/75 |

FOREIGN PATENT DOCUMENTS

| | | |
|---|---|---|
| JP | 58-085970 | 5/1983 |
| JP | 63-304481 | 12/1988 |
| JP | 05-298812 | 11/1993 |
| JP | 2001-023252 | 1/2001 |
| JP | 2001-023256 | 1/2001 |

* cited by examiner

*Primary Examiner*—K. Wong
(74) *Attorney, Agent, or Firm*—Townsend and Townsend and Crew LLP; Patrick Duncan

(57) ABSTRACT

Embodiments of the invention provide a recording method capable of improving reliability of write data in a magnetic disk drive employing the servo area data system. In a magnetic disk drive according to one embodiment, vibration of a head/slider can be detected with a vibration sensor attached to a head support mechanism. Writing of user data is started from a data area in a track. An abnormal vibration signal is generated by detecting vibration of the head/slider at a colliding position, and an operation for writing user data is interrupted in response to the abnormal vibration signal. After the data sector with the write operation interrupted therein reaches a position of a write head in association with rotation of the magnetic disk as indicated by the line representing a relative operating direction of the write head relative to the track of the write head, the operation for writing the interrupted user data is restarted from the following data sector as indicated by the colliding position.

20 Claims, 13 Drawing Sheets

(A)

(B)

(A)

(B)

(C)

(A)

(B)

(C)

Rotating direction of a disk

MAGNETIC DISK DRIVE AND RECORDING METHOD

CROSS-REFERENCES TO RELATED APPLICATIONS

This application claims priority from Japanese Patent Application No. JP2005-128147, filed Apr. 26, 2005, the entire disclosure of which is incorporated herein by reference.

BACKGROUND OF THE INVENTION

The present invention relates to a technique for improving reliability of data written in a magnetic disk drive, and more specifically to a technique for improving reliability of recorded data against vibration of a write head caused by contact between a head/slider and a projection on a surface of a magnetic disk.

When a magnetic disk drive reads or writes data, a head/slider is allowed to fly above a rotating magnetic disk with a slight clearance therebetween (this clearance is described as flying height hereinafter). In order for a write head formed on the head/slider to be capable of accurately recording data by steadily magnetizing a magnetic layer of the magnetic disk, the flying height during the recording process must be within a prespecified range. When the flying height is too high, a magnetic flux from the write head does not sufficiently reach the magnetic layer, so that particles in the magnetic layer are not sufficiently magnetized and are not aligned in the desired direction. Therefore sometimes a sufficient output cannot be obtained during read operation of the recorded data, or the recorded data are degraded during passage of time even within a guaranteed period, which may sometimes disenable reading of the recorded data.

Recently, a magnetic disk drive is designed so that a flying height of a head/slider is as low as possible for achieving the high recording density. Therefore the possibilities of the head/slider to contact a small projection present on the surface of the magnetic disk more and more increase. The head/slider is required to fly and pivot with a prespecified flying height being raised by a lifting force of an air flow generated on the surface of the magnetic disk. Therefore the head/slider is supported by a suspension assembly having a flexible spring structure. Thus, when the head/slider comes into contact with a minute projection on a surface of the magnetic disk, a flying height of the write head may becomes larger, or a center of magnetization of the write head may displace from a recording position in a track, causing the off-track state.

In a magnetic disk drive, generally recorded data is not read for verification just after the data is recorded to prevent the performance from lowering. Therefore it is required that various conditions relating to reliability of recorded data be within prespecified ranges respectively. For this reason, in a case where the head/slider contacts any projection and the flying height becomes larger or where the off-track state occurs, it is desirable to interrupt the write operation until a flying height or a floating posture of the head/slider is returned to the normal state. To satisfy this requirement, it is necessary to detect fluctuations of the flying height and flying posture during the write operation.

Patent document 1 (Japanese Patent Laid-open No. 2001-23256) discloses a technique enabling a proper write operation in a magnetic optical disk even when vibrations occur. The magnetic disk drive includes an arm for positioning the write head at a position opposite to the magnetic optical disk with a prespecified clearance therebetween and a strain gauge for detecting a clearance between the magnetic optical disk and the magnetic head. When the strain gauge detects that the clearance between the magnetic head and the magnetic optical disk once becomes larger than a prespecified value and then returns to the normal value, the strain gauge supplies digital data after the clearance between the magnetic head and the magnetic optical disk becomes larger than the prespecified value again to the magnetic head.

Patent document 2 (Japanese Patent Laid-open No. 5-298812) discloses the technique for interrupting data write when the off-track state occurs during write operation of data in a sector of a track in a magnetic disk drive and then retrying the data write operation for writing data after interruption when the magnetic disk goes round. This document also discloses a technique for shortening the time required for rewriting data by resuming data write when the off-track state is restored to the normal state before the magnetic disk goes round once to reduce a volume of data to be rewritten.

Patent document 3 (U.S. Pat. No. 5,862,015) discloses a technique for detecting displacement of a suspension assembly from its neutral posture by means of a strain gauge attached to the suspension assembly. FIG. 8 in this document shows a technique for controlling a position of a head by supplying a signal obtained from a strain gauge attached to the end of a flexure tongue to a micro actuator adapted to move the flexure tongue in a lateral direction.

BRIEF SUMMARY OF THE INVENTION

The servo control system for a magnetic disk drive is classified to the data area servo system and to the embedded servo system. FIG. 12 is a view showing a portion of a format of one track in the data area servo system. In a magnetic disk drive based on the data area servo system, servo data is written in servo sectors S1, S2, S3 provided on each of data recording areas of a magnetic disk. The servo sectors are discretely arrayed in a circumferential direction of the magnetic disk with data areas 1, 2, 3 provided each between adjoining servo sectors, and a plurality of data sectors D1, D2, D3 are provided in each data area. Computing for a position of a head/slider relative to the magnetic disk and an operation for correcting the position of the head/slider during the track following operation is performed by a processor according to signals read from servo data by a read head.

The write head and read head are controlled so that either one of them can be active. When user data is written in the data sectors D1, D2, and D3, the read head is activated at the timing when servo data is read from the servo sectors S1, S2, S3. In addition, the write head is activated when the user data is written in the data areas 1, 2, 3. In FIG. 12, servo sectors and data sectors are arrayed in series in the rotation direction of the disk. A hybrid type of magnetic head with a write head and a read head formed separately on the slider may be mounted on a rotary actuator. In this case, when this magnetic head moves above a magnetic disk, a yawing angle relative to a tangent line of a track is generated between the write head and read head. Consequently, the servo sectors indicating positions of the data sectors D1, D2, D3 in each of the data areas 1, 2, 3 are generally not arrayed on the same track. In this case, when the write head is positioned at a center of each of the data sectors D1, D2, D3, the read head is positioned at any position displaced in the radial direction of each of the servo sectors S1, S2, S3.

When data is recorded while the following operation is being performed, the read head is positioned at a prespecified position of each of the servo sectors S1, S2, S3, while the write head is positioned at a center of each of the data sectors D1, D2, D3. The read head intermittently reads servo data at the positions of servo sectors S1, S2, S3. The processor corrects a position of the write head by controlling the actuator based on a position error signal (described as PES hereinafter) generated from the servo data read signal. For instance, when a position of the head/slider is corrected in the servo sector S1, the write head passes over the data sectors D1, D2, D3 in the data area 1 at a corresponding position determined when the write head passes over the servo sector S1. Specifically, the positional information obtained at the read timing for the servo sectors S1, S2, S3 at the heads of the data areas 1, 2, 3 respectively determines a position of the write head against each data sector in each of the subsequent data areas.

As a technique for detecting a flying height of a head/slider in a magnetic disk drive already shipped to the market, there is a method of detecting a flying height based on a fluctuation value of read output from a head as described in Japanese Patent Laid-open No. 2000-195210. With this method, a flying height can be detected according to the read timing of servo data while writing data. A flying height may become larger or the off-track state may occur due to a physical impact loaded to a magnetic disk drive from the outside. In this case, a high frequency component of vibrations caused by the physical impact attenuates before the component reaches a suspension assembly supporting the head/slider, and the head/slider vibrates with a low frequency in the range from several KHz to several dozens KHz. Therefore, the write operation can be interrupted by detecting the abnormal recording state at the timing of reading servo data.

However, for instance, when the head/slider contacts a minute projection on the surface of a magnetic disk, the vibrations are propagated from the head/slider as a source of vibrations to the suspension assembly, and the head/slider itself vibrates with a frequency of as high as, e.g., several hundred KHz. Therefore, it is probable that a fluctuation frequency of the flying height or the off-track state is almost equal to the frequency. Actually, when a test for reading and writing data is performed in the environment where a head/slider may contact a projection, the following results are obtained. That is, read errors often occur in a data sector with the write capacity of 512 bytes or more, and 2 to 3 portions are detected in which accurate data write has not supposedly been made, and a read error seldom occurs in the remaining portion.

In this situation described above, it is probable that, while the write head passes over a data sector of 512 bytes, the head/slider contacts a projection and vibrations causing fluctuation of a flying height or generation of the off-track state occurs 2 or 3 times in the head/slider. Even if it is tried to detect fluctuations of a flying height at the timing for reading servo data when the head/slider vibrates with a high frequency, the vibrations may have often ceased at the timing. It is therefore impossible to interrupt the write operation by detecting the abnormal recording state. Thus, in order to improve the reliability of recorded data, a technique is required to interrupt a write operation by detecting vibrations generated in the head/slider while the head/slider is flying above a data area for writing data and to restart the operation for writing data after the vibrations cease.

A feature of the present invention is to provide a recording method ensuring improved reliability of recorded data in a magnetic disk drive employing the servo area data system. Another feature of the present invention is to provide a recording method enabling interruption of a write operation by detecting vibrations of a head/slider with high frequencies at which the head/slider vibrates several times for one data sector during the write operation and restart of the write operation after the vibrations cease. Still another feature of the present invention is to provide a magnetic disk drive enabling realization of the recording method as described above.

With the present invention, when a head/slider comes into contact with a projection present on a magnetic disk or any dust or solidified lubricant deposited during the production process and remaining thereon or generated after start of the write operation and the head/slider vibrates to disable the normal operation for writing data, an operation for writing data is interrupted once by detecting such an abnormal state, and then the write operation is restarted after the flying state of the head/slider returns to the normal one. Thus the reliability of written data is improved.

According to a first aspect of the present invention, there is provided a magnetic disk drive having a plurality of servo sectors discretely arrayed along a circumferential direction thereof and a plurality of data areas each provided between adjoining servo sectors and including a plurality of data sectors, the magnetic disk drive comprising: a head/slider having a write head for writing user data in the data sector formed thereon; a head support mechanism including a suspension assembly for supporting the head/slider; a vibration sensor attached to the suspension assembly; a vibration output generating section for generating an abnormal vibration signal based on a vibration signal received from the vibration sensor during a write operation; and a control section for controlling the magnetic disk drive so that an operation for writing the user data is interrupted, during the write operation for one track, at a data sector in response to the abnormal vibration signal and then restarted from the data sector at which the write operation has been interrupted when the data sector reaches a position of the write head in association with rotation of the magnetic disk.

According to a second aspect of the invention, there is provided a method of recording user data in one track in a magnetic disk drive employing a data area servo system, the method comprising: a step of providing a vibration sensor attached to a head support mechanism and being able to detect vibrations of a head/slider; a first write step of starting an operation for writing user data in the track; a step of generating an abnormal vibration signal in response to the vibration sensor during the write operation in the first write step; a step of interrupting the operation for writing the user data in response to the abnormal vibration signal at a sector with the user data currently being written therein and on; and a second write step of starting the operation for writing the interrupted user data when the interrupted data sector reaches a position of the write head in association with rotation of the magnetic disk.

According to a third aspect of the invention, there is provided a method of recording user data in one track in a magnetic disk drive employing a data area servo system, the method comprising: a step of providing a vibration sensor attached to a head support mechanism and being able to detect vibrations of a head/slider; a first write step of starting an operation for writing the user data in the track; a step of generating an abnormal vibration signal in response to the vibration sensor during the write operation in the first write step; a step of interrupting the operation for writing the user data in response to the abnormal vibration signal until a prespecified number of servo sectors from the interrupted data sector pass a position of the write head; a second write step of starting the operation for recoding the user data following the write operation-interrupted user data from the data sector following the prespecified number of servo sectors; and a third write step of starting the operation for writing the write operation-interrupted user data when the write operation-interrupted data sector reaches a position of the write head in association with rotation of the magnetic disk.

The present invention can provide a recording method enabling improvement of the reliability of recorded data in a magnetic disk drive employing the servo area data system. The present invention can further provide a recording method in which a write operation is interrupted, when vibrations of a head/slider with a high frequency at which the head/slider vibrates several times for one data sector are detected during the write operation, and then the interrupted data is written after the vibrations cease. The present invention can further provide a magnetic disk drive capable of realizing such a recording method.

DETAILED DESCRIPTION OF THE INVENTION

Outline of the Magnetic Disk Drive

Figure 1:
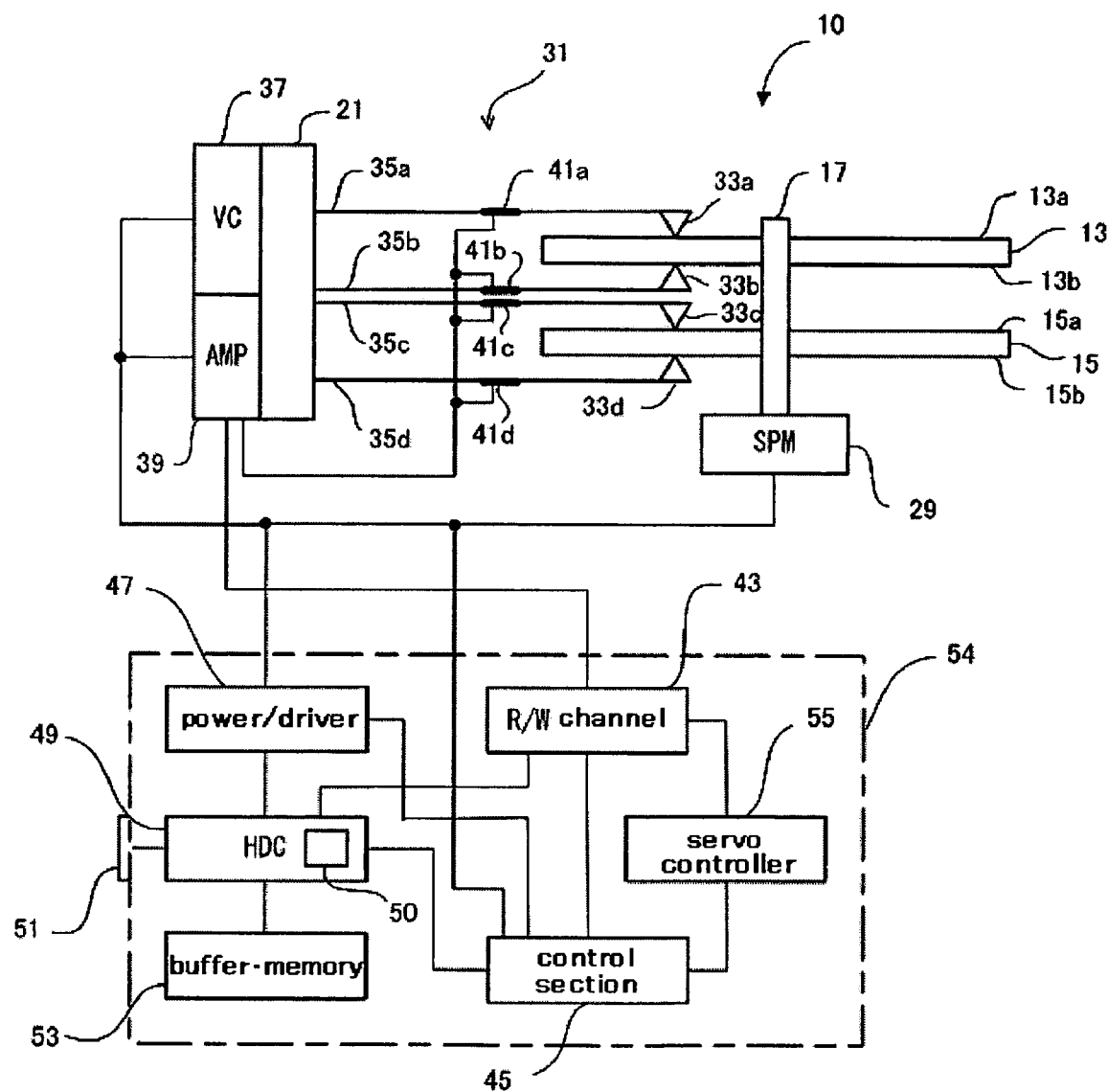
FIG. 1 is a general block diagram illustrating a magnetic disk drive.
Figure 2:
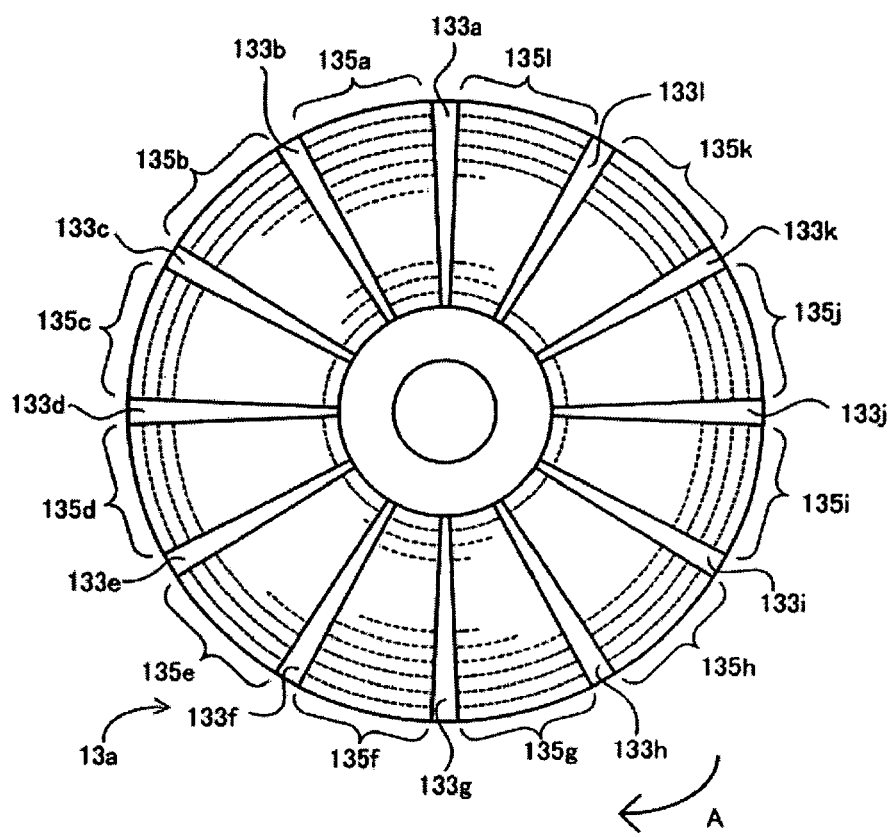
FIG. 2 includes diagrams showing a format of the magnetic disk.
Figure 2:
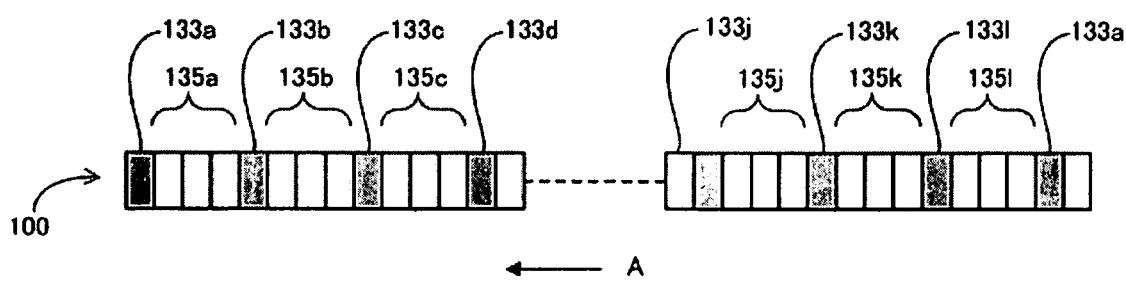
Figure 3:
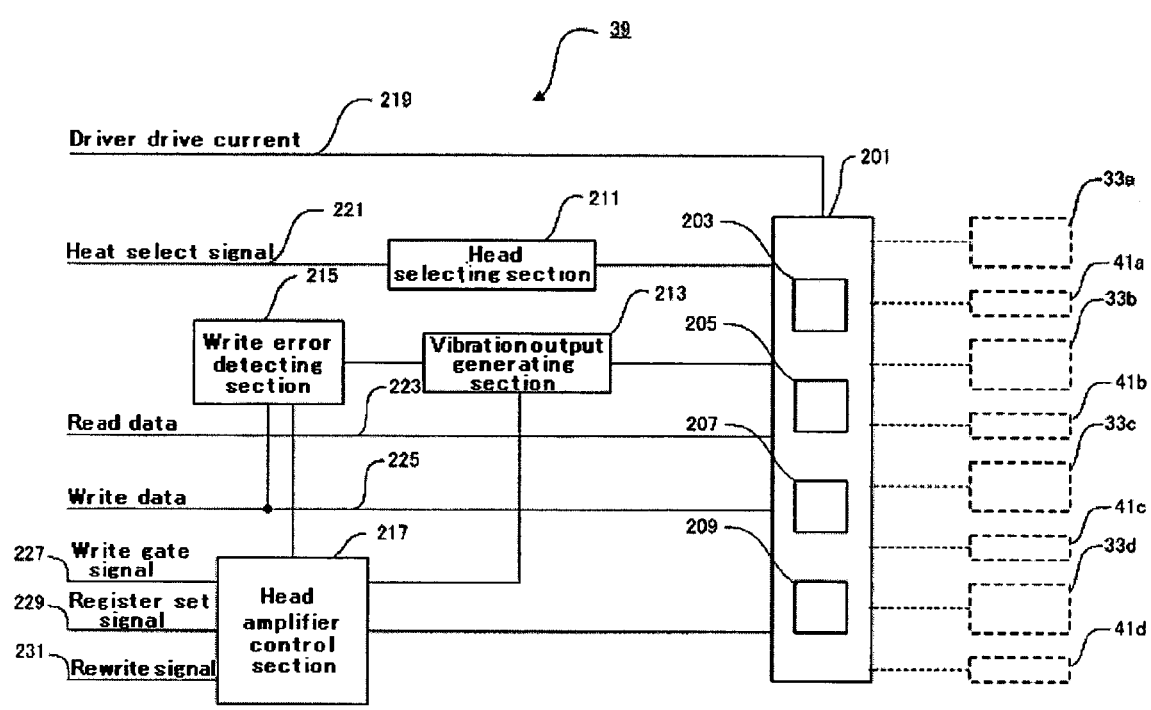
FIG. 3 is a general block diagram showing a head amplifier.

FIG. 1 is a block diagram showing a magnetic disk drive 10 according to an embodiment of the present invention, FIG. 2 includes diagrams showing a format of a magnetic disk 13a, and FIG. 3 is a general block diagram showing a head amplifier 39. In FIG. 1, magnetic disks 13, 15 are fixed with clamps to a rotor section of a spindle motor 29 provided on a base, and rotate together at a prespecified rotational speed around a spindle 17.

Each of the magnetic disk drives 13, 15 has corresponding two recording surfaces 13a, 13b; 15a, 15b. The magnetic disk drive 10 employs the data area servo system (also called the embedded servo system) as shown in FIG. 2. On each of the recording surfaces 13a, 13b, 15a, 15b, there are provided a plurality of servo sectors 133a to 133l each radially arrayed with an equal interval therebetween as shown in FIG. 2(A) illustrating a case of the recording surface 13a, and servo data is written in each of the servo sectors. The magnetic disk rotates in the direction indicated by the arrow A in the figure. Although the number of servo sectors is fewer as compared to the actual number for simplification of the figure, for instance, the number is around 300. The servo data defines a servo track. The servo track is simply described as track hereinafter. Each of the data areas 135a to 135l with data sectors defined therein is provided between adjoining servo sectors.

The servo data includes a servo AGC for adjusting a gain of an amplifier before reading of servo data, a servo mark indicating start of the servo data, a track address written with a gray code, a sector address indicating a position of a servo sector in the circumferential direction, and a burst pattern for generating a PES indicating a shift rate of a read head from a center of a track. The burst pattern is formed with four types of patterns each with the write position displaced in the radial direction.

FIG. 2(B) linearly shows a format of a given track 100 forming a circuit. On this track, three data sectors are defined in each of data areas 135a to 135l provided between adjoining data sectors, and what is described above is also true for other tracks. To simplify descriptions, only three data sectors are shown in this figure. However, actually one data area is not formed with an integral number of data sectors, whereas the technique is employed in which one data sector overrides a servo sector, which technique is called split sector. Further, also the configuration is often employed in which a plurality of zones are provided in the radial direction of a magnetic disk, the same number of data sectors are provided in one track in one and the same zone, and the number of data sectors is differentiated from zone to zone for the purpose of providing uniform recording density. The known systems as described above may be employed in the present invention. Each data sector can store therein data of 512 bytes, but in this invention, a memory capacity of each data sector can freely be defined. A position of each data sector can be identified during an operation for writing user data by referring to a position of the header servo sector. More specifically, when a magnetic disk rotates in the direction A indicated by the arrow A, a position of each data sector is determined by referring to an elapsed period of time or the number of pulses received after detection of a position of a servo sector 133a by the read head. A dedicated area, to which a user cannot access, is defined in a portion of the recording surface 13a, and a recording control program for controlling the write operation according to the present invention is stored in this dedicated area.

Figure 4:
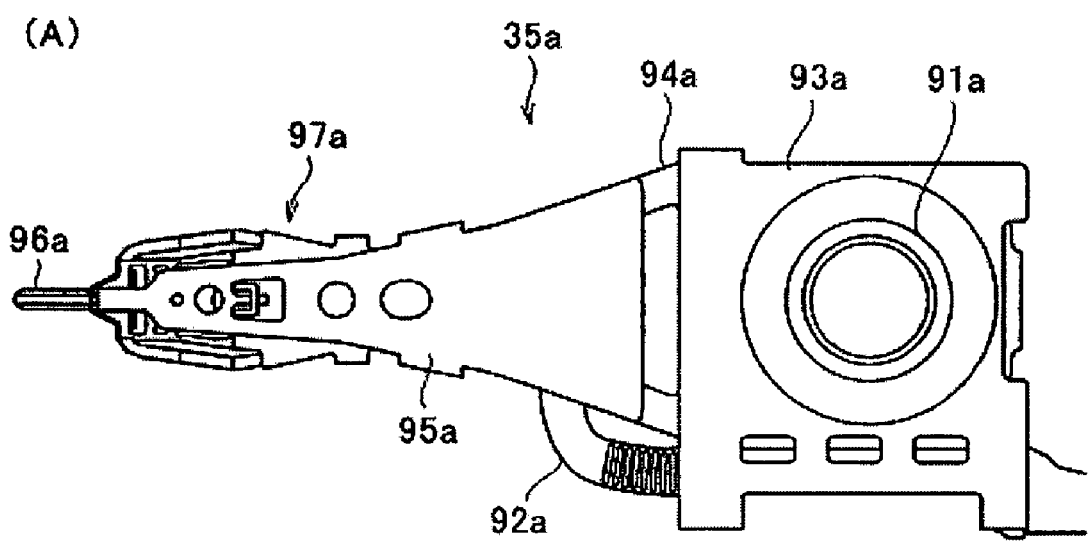
FIG. 4 includes plan views of a head gimbal assembly.
Figure 4:
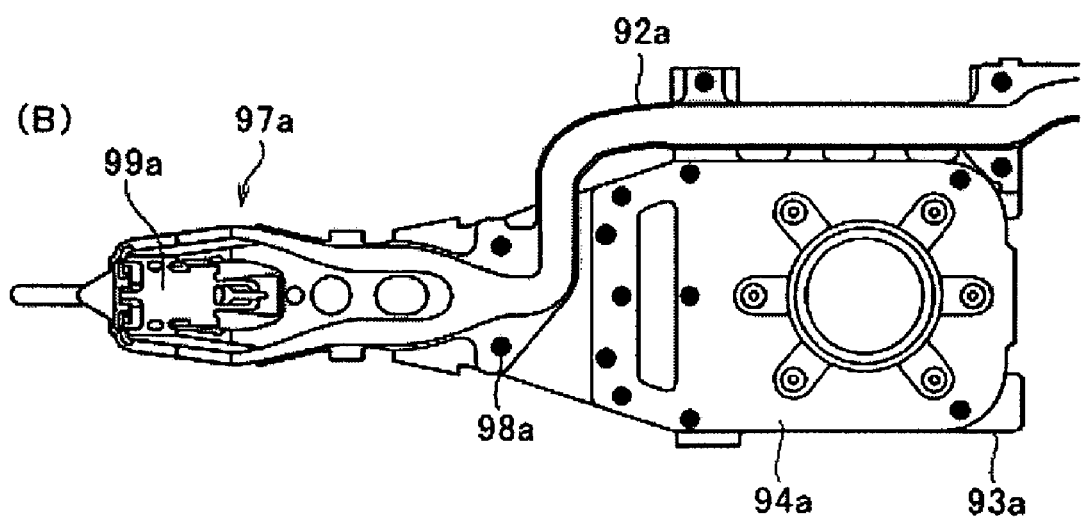

A head support mechanism 31 is formed of head gimbal assemblies (described as HGA hereinafter) 35a, 35b, 35c, 35d and an actuator assembly 21. The HGAs 35a, 35b, 35c, 35d have head/sliders 33a, 33b, 33c, 33d associated with recording surfaces 13a, 13b, 13c, 13d, respectively. Components provided by removing the head/sliders from the HGA are called a suspension assembly. The HGAs 35a, 35b, 35c, 35d have substantially the same structure, and the structure is described below by referring to the HGA 35a shown in FIG. 4 by way of example. FIG. 4(A) is a plan view showing the HGA 35a as viewed toward the recording surface 13a, while FIG. 4(B) is a plan view showing the HGA 35a as viewed from the recording surface 13a.

The HGA 35a is based on a wiring-integrated suspension structure whose key section is formed of a head/slider (not shown), a base plate 93a, a load beam 95a, a hinge 94a, a mount plate 91a, and a flexure assembly 97a. The base plate 93a is formed with an opening section, and the HGA 35a is fixed to an actuator arm of the actuator assembly 21 by swaging the mount plate 91a fixed to the base plate 93a through this opening section.

The hinge 94a has elasticity and couples the base plate 91a to the load beam 95a so as to give a pressure loading to the load beam 95a so that the head/slider can appropriately fly above the magnetic disk. A lift tab 96a is formed at a tip section of the HGA 35a and slides on a ramp (not shown) for realizing the load/unload system. A flexure assembly 97a sustains at its distal end a lead wire 92a extending from the tip section of the HGA 35a to a connector section to an FPC in the crank form, and is spot-welded with a laser to positions indicated by a plurality of black circles 98a on the load beam 95a as well as on the base plate 93a. The lead wire 92a includes four conductors connecting a magnetic head formed on the head/slider 33a to the circuit. The flexure assembly 97a has a flexure tongue 97a used as a position for fixing the head/slider 33a.

Figure 13:
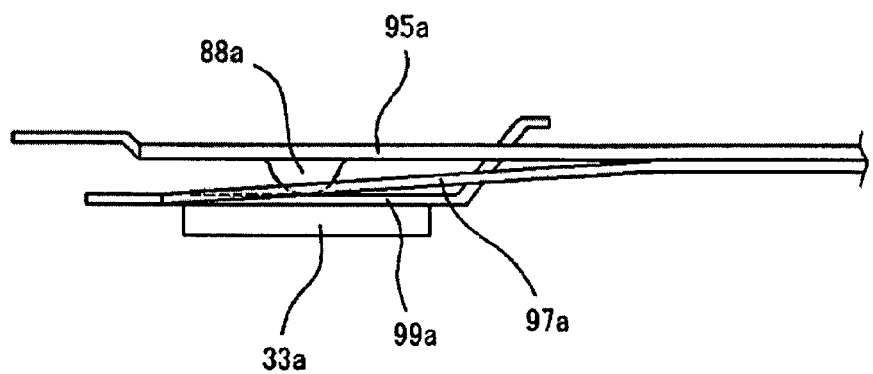
FIG. 13 is a side view showing a tip section of the head gimbal assembly.

FIG. 13 is a side view showing a tip section of the HGA 35a. The head/slider 33a is fixed to a flexure tongue 99a of the flexure assembly 97a, which performs a pivot movement or a gimbal movement around a dimple 88a formed on the load beam as a support point during a track following operation to control a flying height of the head/slider 33a within a prespecified range. The flexure assembly 97a operates following irregularities of a magnetic disk, while the head/slider 33a is flying due to the effect of air bearing, to control the flying height within the prespecified range. Because of the specific performance of the flexure assembly 97a, when the head/slider 33a contacts a projection or the like on a magnetic disk, the head/slider 33a easily vibrates with a high frequency to fluctuate a flying height of the head/slider 33a or cause the off-track state of the head/slider 33a. An induction write head and a GMR (Giant Magnetic Resistance Effect) read head constitute a hybrid type magnetic head, which is formed on each of the head/sliders 33a, 33b, 33c, 33d. Strain gauges 41a, 41b, 41c, and 41d are formed on the flexure assemblies of the HGAs 35a, 35b, 35c, and 35d, respectively. Those structures are described hereinafter with reference to FIGS. 5 to 7.

Referring to FIG. 1 again, the actuator assembly 21 is a rotary actuator including an actuator arm supporting the HGAs 35a, 35b, 35c, 35d, a fixed portion of a pivot assembly forming a pivot shaft, and a coil support for supporting a voice coil 37, and rotates the HGAs 35a, 35b, 35c, 35d together around the pivot shaft. The voice coil 37, a yoke and a voice coil motor (both not shown) constitutes a voice coil motor (referred to as VCM hereinafter). A head amplifier 39 is attached to a carriage assembly 21. The head amplifier attached to the carriage assembly 21 is a semiconductor element, which is sometimes called arm electronics (AE) or chip-on-suspension (COS). The structure of the head amplifier 39 is described later with reference to FIG. 3.

Figure 14:
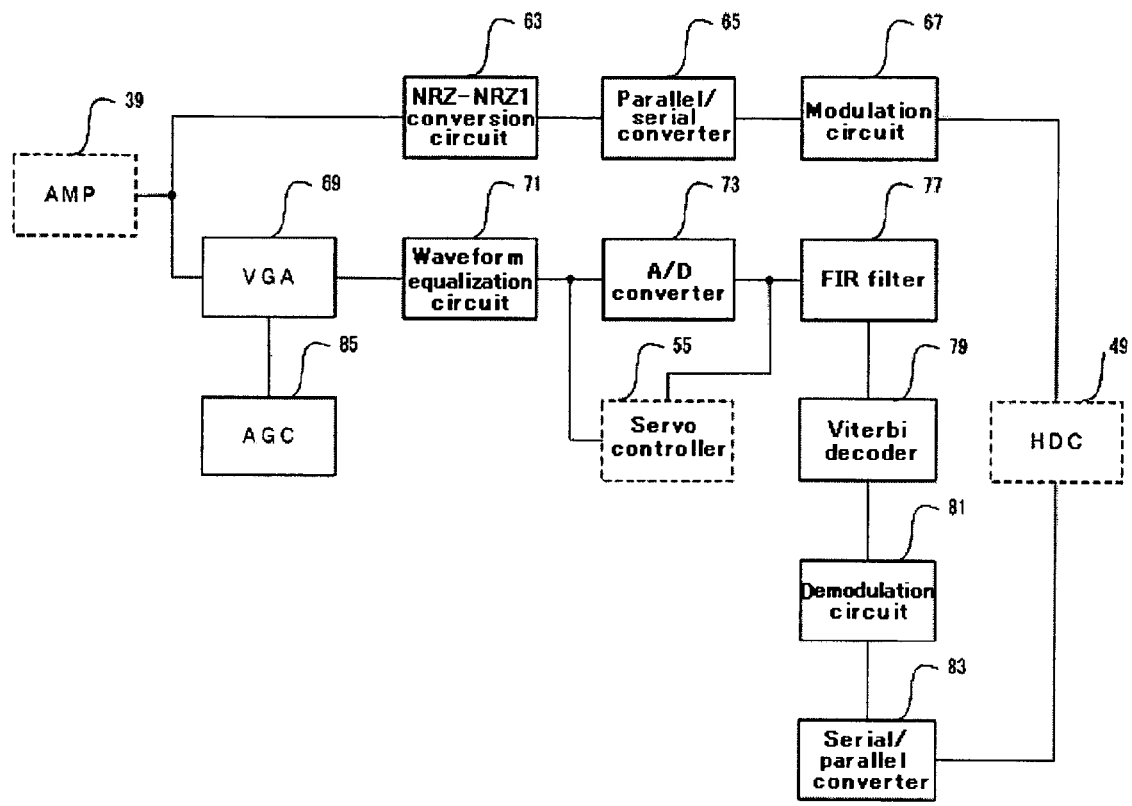
FIG. 14 is a general block diagram showing a read/write channel.

A circuit board 54 is attached to the base from the outside, and the circuit board 54 has a read/write channel (described as R/W channel hereinafter) 43, a servo controller 55, a control section 45, a power/driver 47, a hard disk controller (HDC) 49, and a buffer memory 53. The R/W channel 43 is a circuit for processing a write signal and a read signal for user data or servo data. FIG. 14 is a general block diagram showing the R/W channel 43.

The R/W channel 43 includes a write circuit and a read circuit, and switches the operation mode according to a read gate signal or a write gate signal received from the control section 45. The write circuit is formed mainly of a demodulation circuit 67, a parallel/serial converter 65, and an NRZ-NRZI conversion circuit 63. The read circuit is formed mainly of a variable gain amplifier (VGA) 69, an automatic gain control section (AGC) 85, a waveform equalization circuit 71, an A/D conversion circuit 73, an FIR filter 77, a Viterbi decoder 79, a demodulation circuit 81, and a serial/parallel converter 83.

Referring to FIG. 1 again, the servo controller 55 has an address detection circuit, a sample hold circuit, a sampling signal generation circuit, and a computing circuit. The address detection circuit reads out a servo mark for servo data from a read pulse signal outputted from the A/D converter 73 in the R/W channel 43, generates a servo interrupting signal, and further generates and sends a sector address signal and a track address signal for the servo sector to the control section 45. The sample hold circuit holds a read signal (described as a burst signal hereinafter) for the burst pattern sent from the waveform equalization circuit 71 in the R/W channel 43 until the read head reads new servo data.

The sampling signal generation circuit generates a sample timing signal for specifying the timing for reading the four burst signals sent from the A/D conversion circuit 73. The servo controller 55 generates a positional error signal (PES) in the sample hold circuit, sampling signal generation circuit, and computing circuit, and sends the signal to the control section 45. The HDC 49 plays a role as an interface with the host computer and includes an ECC circuit for generating a correction bit associated with a data bit sent from the controller controlling a buffer memory 53 or the host computer or for correcting the user data read from a magnetic disk.

The buffer memory 53 realizes functions as a write cache and a read cache for carrying out high-speed data transfer between the host computer and the magnetic disk drive 10. The HDC 49 has a cache memory 50 incorporated therein for temporarily storing therein data just before written in the magnetic disk. The cache memory 50 has the FIFO (Fist In First Out) function, and has a capacity (512 bytes×6) equivalent to that of a data sector overriding two servo sectors. To carry out the present invention, a cache memory is required to have a memory capacity equivalent to that of one servo sector. However, a capacity of the cache memory may be changed into an appropriate size according to various embodiments of the recording method according to the present invention described below.

The power/driver 47 includes: an SPM driver for supplying an operation current to a spindle motor 29; a VCM driver for supplying an operation current to the voice coil 37; a DA converter for converting a digital operation signal sent from the control section 45 to an analog signal and supplying the analog signal to each driver; and a power circuit for supplying a power to the entire magnetic disk drive. An interface connector 51 for data communications with the host computer is attached to the circuit board 54. Both of the SPM driver and VCM driver are controlled according to an operation signal from the control section 45.

The control section 45 includes: a processor (CPU) for controlling operations of the entire magnetic disk drive 10; a ROM adapted to store therein various types of programs; an EEPROM adapted to store therein various parameters;

and a RAM used for execution of a program or used as a work area. When an address of a target track is specified from a host computer for execution of a seek operation, the CPU recognizes a position of a magnetic head during the seek operation according to a track address read from servo data and sends an operation signal to the VCM driver. The CPU reads a track address from a servo sector on which the read head passes during the seek operation, computes an actual movement speed of the head/slider, and generates an operation signal to the VCM driver to control a speed of the head/slider so that the difference from a value prespecified in the speed table is made as small as possible.

The CPU switches the speed control to the position control when the read head approaches a target track, and computes a value of an operation signal to be sent to the VCM driver to position the read head at a target position based on a PES sent from the servo controller 55. An operation of the CPU for controlling the VCM using a PES for positioning a read head at a target position is referred to as the following operation. The CPU realizes the recording method according to the present invention by executing the record control program read out from a dedicated area provided on the recording surface 13a of the magnetic disk into the RAM.

Configuration of the Head Amplifier

FIG. 3 is a general block diagram showing the head amplifier 39. A read/write driver (referred to as R/W driver hereinafter) 201 receives a driver drive current through a line 219 from the power/driver 47. The R/W driver 201 includes a R/W module 203 associated with the head/slider 33a and strain gauge 41a, a R/W module 205 associated with to the head-slider 33b and strain gauge 41b, a R/W module 207 associated with the head-slider 33c and strain gauge 41c, and a R/W module 209 associated with the head-slider 33d and strain gauge 41d.

Each of the R/W modules 203, 205, 207, 209 includes a write driver for supplying a record current to the corresponding write head, and a read amplifier for supplying a bias current to the GMR read head and taking out a change in electric resistance, as a change in voltage, due to the effect of a magnetic field generated by data written in a magnetic disk. Each of the R/W modules further has a Wheatstone's bridge circuit connected to corresponding one among the strain gauges 41a, 41b, 41c, 41d or any known resistance change detection circuit. The Wheatstone's bridge circuit is an analog circuit adapted to receive a change in resistance in a distortion circuit as a signal indicating vibrations of the suspension assembly and output the signal as a change in voltage.

The R/W driver 201 transfers read data through a line 223 to the R/W channel 43 and receives write data through a line 225 from the R/W channel 43. A head selecting section 211 receives a head select signal generated by the HDC 49 through a line 221, and activates any one of the four R/W modules 203, 205, 207, 211. A vibration output generating section 213 receives a voltage corresponding to a strain rate of a strain gauge from the Wheatstone's bridge circuit in the activated R/W module, converts the signal to a digital signal, and compares the digital signal with a prespecified threshold value.

A strain gauge strains according to vibrations of the suspension assembly to change the resistance value, and therefore an output voltage from the Wheatstone's bridge circuit shows an attenuation waveform corresponding to amplitude of the vibrations. In this embodiment, it is necessary to detect vibrations with high frequency causing vibrations several times in the head/slider during passage of the write head over one data sector. Therefore when the largest amplitude appearing immediately after generation of the vibrations is over the threshold value, the vibration output generating section 213 sends a digital signal indicating abnormal vibrations to a write error detecting section 215. The vibration output generating section 213 is further connected to a head amplifier control circuit 217, and is controlled to be active only when a write gate signal is enabled. Therefore, even when a resistance value of a strain gauge changes due to vibrations of the suspension assembly at the time of load/unload operation or during a seek operation, the vibration output generating section 213 does not output an abnormal vibration signal.

The write error detecting section 215 generates a writing interrupt signal for rewriting data when an error occurs during the write operation, and sends the signal to the head amplifier control circuit 217. More specifically, for instance, the write error detecting section 215 sends a writing interrupt signal to the head amplifier control circuit 217, when the write error detecting section 215 receives an abnormal vibration signal from the vibration output generating section 215, when write data is not transferred through the line 225 at the timing for write operation, when a wiring route to the write head is disconnected, or when a power for the head amplifier 39 is abnormal. It is advantageous to send the abnormal vibration signal from the vibration output generating section 213 via the write error detecting section 215 to the head amplifier control section 217. This is because the circuit is shared by an interrupt signal generated due to some other reasons. However, the abnormal vibration signal may be sent directly from the vibration output generating section 213 to the control section 45 without passing through the write error detecting section 215 nor head amplifier control section 217.

The head amplifier control section 217 receives a write gate signal through a line 227 from the control section 45 and switches the operation mode of the head amplifier 201 between write mode and read mode. When the write gate signal is disabled, the head amplifier 201 operates in the read mode. Also the head amplifier control section 217 receives a preset value in a register from the control section 45 through a line 229, and sets a value for a register incorporated therein. The register supplies to the head amplifier 201 a preset value to the write driver for setting the magnitude of a write current according to a temperature inside the magnetic disk drive or a preset value to the read amplifier for setting a gain of a read signal. The register value is set when power to the magnetic disk drive is turned ON. The head amplifier control section 217 receives a writing interrupt signal from the write error detecting section 215 and sends a rewrite signal through a receiving line 231 to the control section 45.

Method of Forming the Strain Gauge

A description will be made below of a method of forming the strain gauges 41a, 41b, 41c, 41d on the HGAs 35a, 35b, 35c, and 35d, respectively. The strain gauges 41a, 41b, 41c, 41d are formed on the HGAs 35a, 35b, 35c, and 35d, respectively, with the same configuration. In the vibrating mode in which a head/slider collides a projection to cause vibrations, vibrations of the flexure assembly are expectedly most severe. Therefore, it is desirable to form a strain gauge on the flexure assembly for improving detection sensitivity. However, the present invention is not intended to limit a position adaptable to form a strain gauge, to the flexure assembly, and includes a method of forming an HGA by determining the position through examination of response characteristics for various positions. The flexure assembly is accurately designed and manufactured for enabling pivot movement with high precision, and attentions should be paid not to affect the operational performance of the flexure assembly with formation of a strain gauge. Therefore, when the method is employed in which a foil gauge formed of a plastic film as a base and a resistive foil on the base is adhered with adhesive, sometimes it may be difficult to maintain the operational performance. In this embodiment, to reduce negative influence over the operational performance of the flexure assembly, a pattern for a strain gauge is directly formed on a metal layer by a pattern printing method or photolithography.

FIG. 5(A) is a plan view showing a tip section of the flexure assembly 97a as viewed from the side of recording surface 13a of the magnetic disk. The structure shown in FIG. 5(A) is formed of the respective patterns shown in FIGS. 5(B) to 5(E) serially laminated on each other, and the structure is called a wiring integrated type suspension. The wiring integrated type suspension is classified to an additive type, a subtractive type, and an FPC type according to the production method. The additive type suspension as used herein is a suspension formed by adding copper foil wiring and a pad onto an insulating body laminated on the metal layer. The subtractive type suspension is a suspension formed by etching copper foil formed in the sheet state on an insulating body laminated on a metal layer to form wiring and a pad. The FPC type suspension is a suspension formed by adhering a flexible printed circuit board (FPC) with the wiring and a pad of copper foil formed thereon to a metal layer of the flexure assembly.

FIG. 5(B) is a plan view of a metal layer 301a formed of a thin stainless steel plate for forming a spring structure of the flexure assembly 97a. FIG. 5(C) is a plan view of an insulating layer 303a formed of polyimide that is laminated on the metal layer 301a. FIG. 5(D) is a plan view showing a wiring layer 305a formed of copper that is laminated on the insulating layer 303a. FIG. 5(E) is a plan view of a protective layer 307a formed of polyimide that is laminated on the wiring layer 305a.

Figure 5:
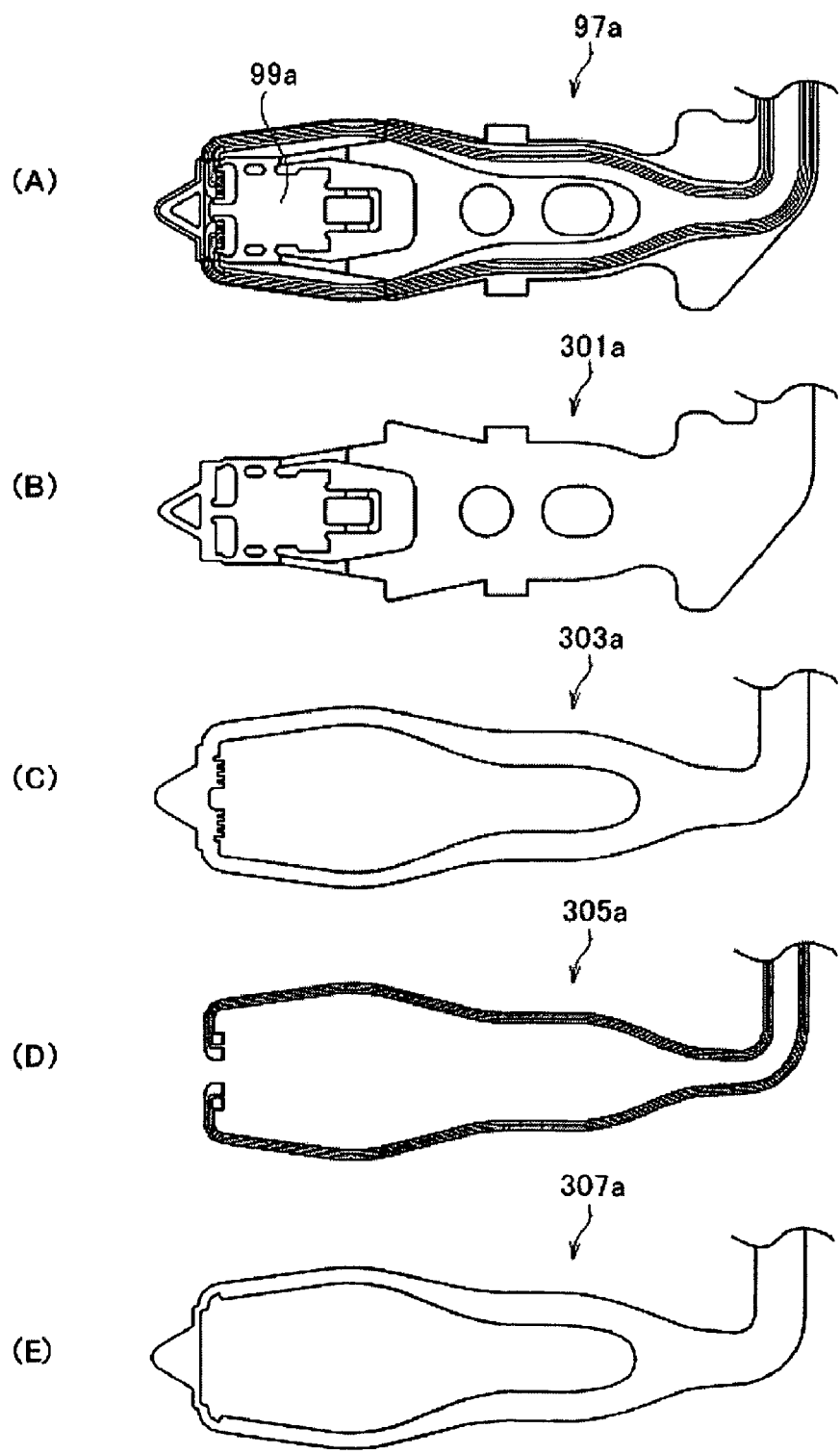
FIG. 5 includes views illustrating a structure of a flexure assembly.
Figure 6:
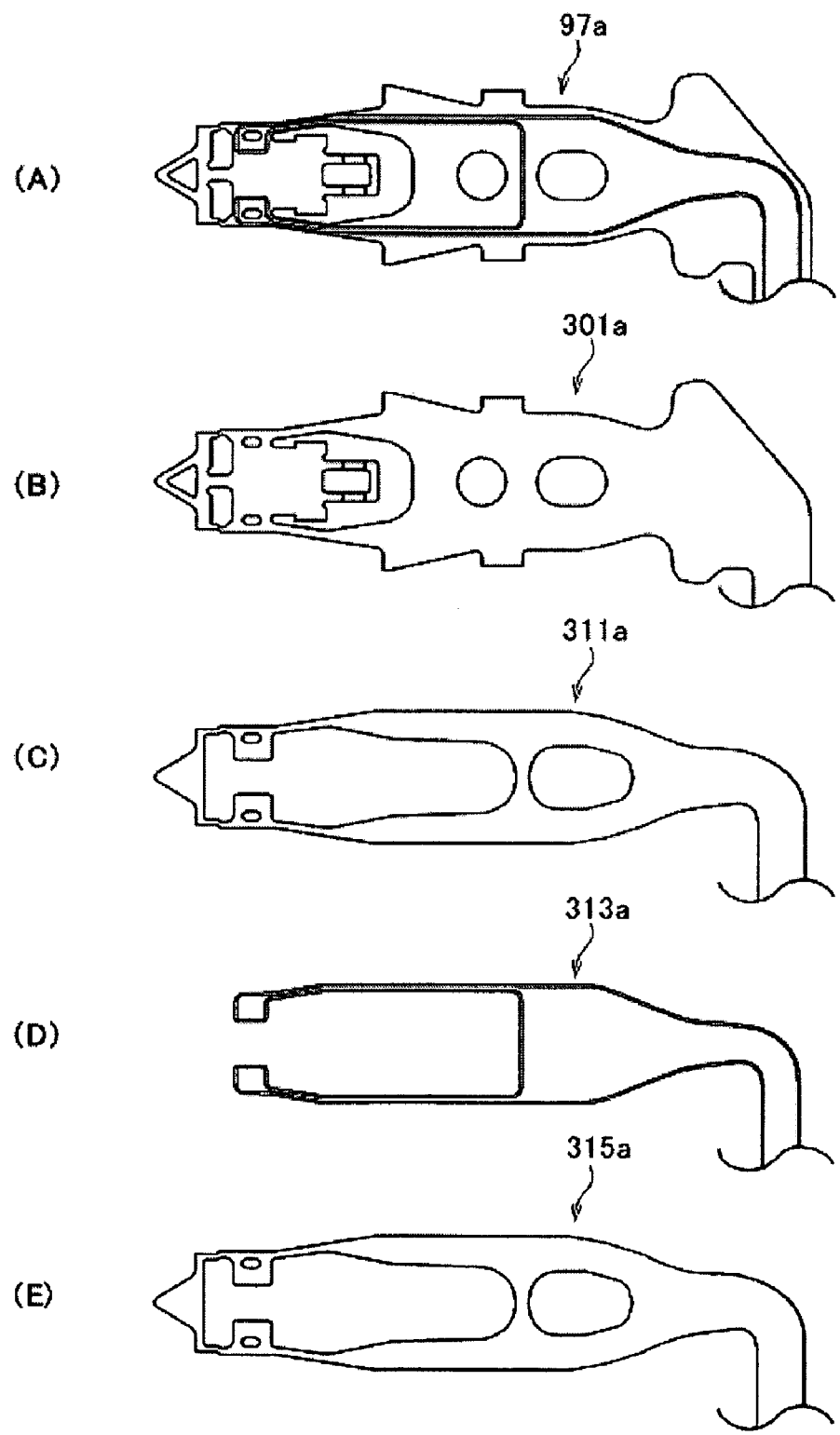
FIG. 6 includes views illustrating a pattern of a strain gauge formed on the flexure assembly.

FIG. 6 is a plan view showing a face of the flexure assembly which is opposite with the face shown in FIG. 5 and faces the load beam 95a. The structure shown in FIG. 6(A) is formed by serially laminating respective patterns shown in FIGS. 6(B) to 6(E). FIG. 6(B) is a plan view showing a face of the metal layer 301a formed of a thin stainless steel plate for forming a spring structure of the flexure assembly, and the face is on the side of the load beam. FIG. 6(C) is a plan view of an insulating layer 311a formed of polyimide that is laminated on the metal layer 301a. FIG. 6(D) is a plan view showing a pattern 313a of a resistor body formed of such a material as copper, nickel, or platinum that is laminated on the insulating layer 311a. The pattern 313a of the resister body is formed such that the gauge axis extends along the longitudinal axis of the flexure assembly 97a.

Figure 15:
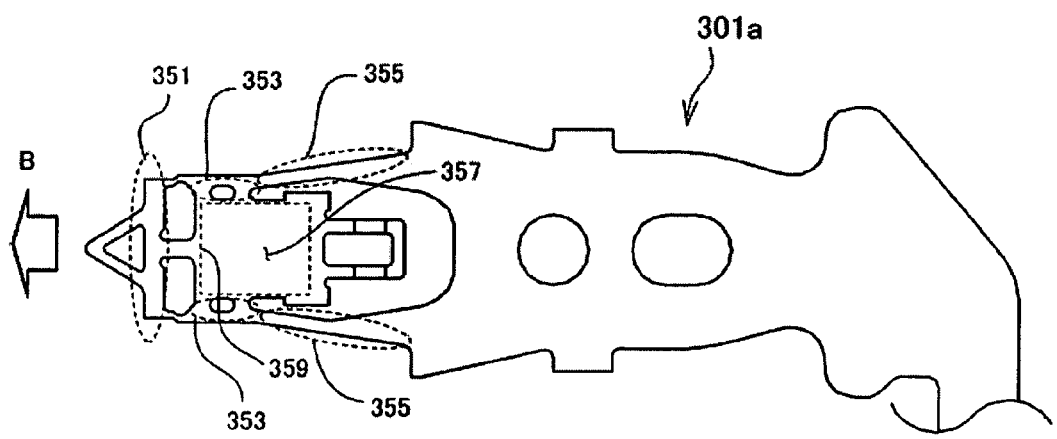
FIG. 15 is a view illustrating where a resister pattern is formed on a metal layer of the flexure assembly.

FIG. 15 is a view illustrating a position of a resister body pattern formed on the metal layer 301a of the flexure assembly 97a. In FIG. 15, the head/slider 33a attached to a rear side of the metal layer 301a is shown with dotted lines. An edge of the head/slider 33a functions as an air outflow edge (trailing edge) 359. Each track of a magnetic disk rotates substantially along the longitudinal direction of the flexure assembly. When a projection collides with a portion of the head/slider 33a on the side of the trailing edge 359, therefore, the metal layer 301a is pulled in the direction indicated by arrow B to generate vibrations. In this state, the areas shown with dotted lines 355 are pulled in the direction indicated by arrow B, and the areas shown with dotted line 353 are subjected to bending stress. However, both the tensile force and bending stress act to the pattern of the resistor body adhered onto the areas in the same direction to cause a telescopic motion of the pattern. On the other hand, the bending stress is loaded also to the area shown with a dotted line 351, but a direction of a telescopic motion of the pattern in this area is contrary to that of a pattern of the resistor body in the area shown with the dotted line 353. Therefore, to detect a telescopic motion of a metal layer with high sensitivity by forming a one-channel strain gauge, it is desirable to form a pattern 313a of the resistor body at a position closer to the actuator assembly as compared to the position of the trailing edge 359 of the head/slider as shown in FIG. 6(D). FIG. 6(E) is a plan view showing a protection layer 315a formed of polyimide that is laminated on the resistor body pattern 313a.

Figure 7:
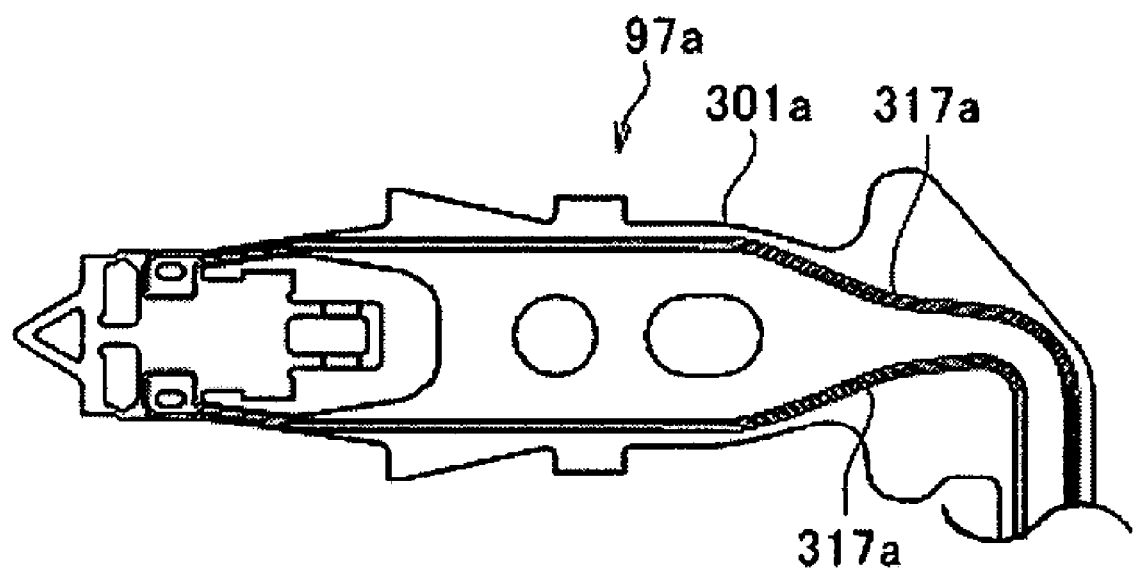
FIG. 7 is a view illustrating a pattern of a strain gauge formed on the flexure assembly.

A strain gauge can be formed on a metal layer by photolithography or a pattern printing method, but in the present invention, the strain gauge may be formed as a semiconductor gauge using the piezoelectric effect or a deposition type semiconductor gauge formed by vacuum deposition of germanium. FIG. 7 is a plan view showing a strain gauge 317a formed as a two-channel gauge. In FIG. 7, two patterns 317a extend symmetrically along the longitudinal axis of the flexure assembly 97a. With the configuration as shown in FIG. 7, by detecting a difference between strains in the two channels, detection with high precision is possible even when the flexure assembly vibrates in the distorted direction relative to the longitudinal axis thereof.

Method of Recording User Data by Using a Vibration Signal from the Strain Gauge

Figure 10:
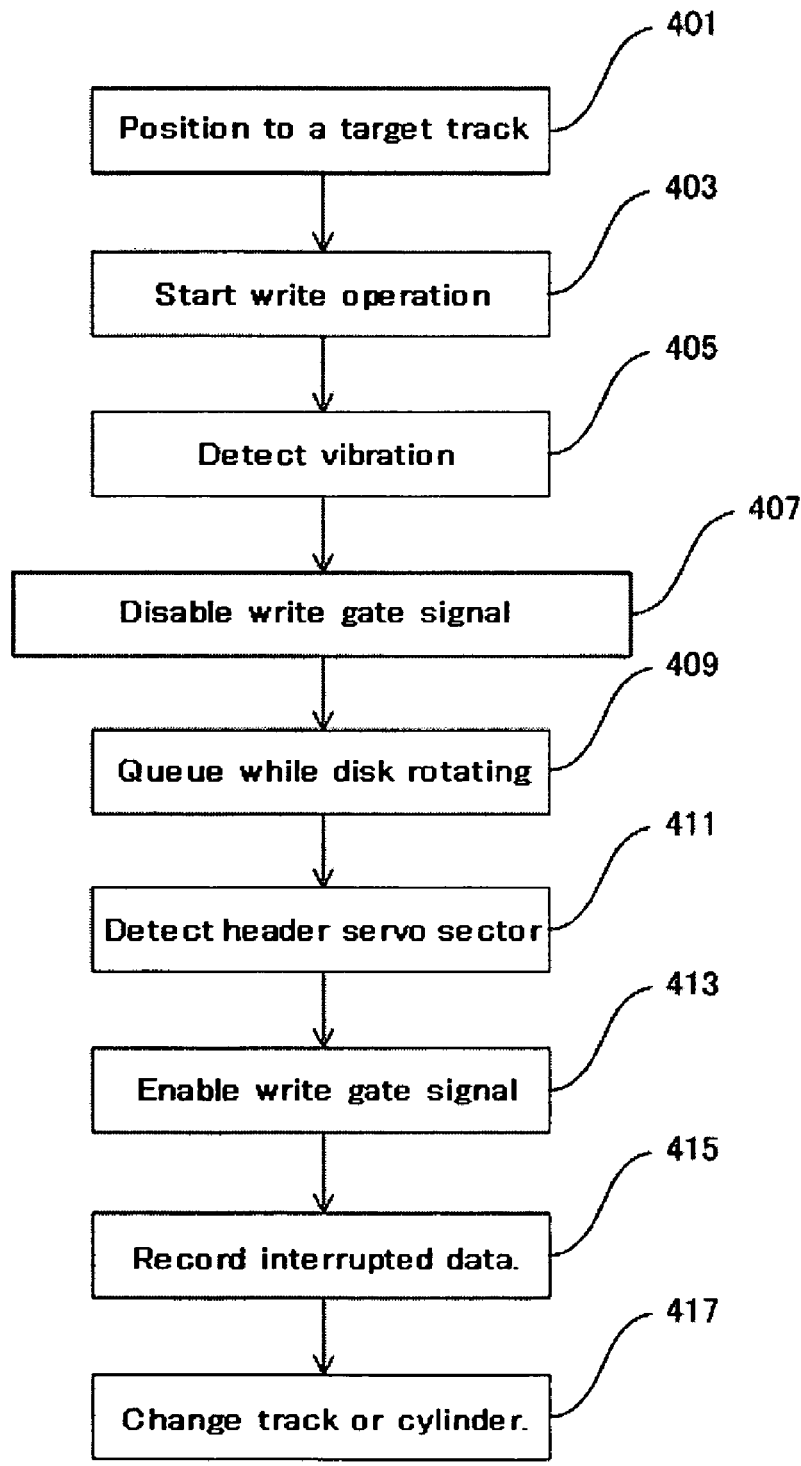
FIG. 10 is a flow chart showing a method of writing user data by using a vibration signal from the strain gauge.

A description will be made of a method of recording user data, in the magnetic disk drive 10, by detecting vibrations of an HGA with a strain gauge with reference to a flow chart of FIG. 10 as well as to FIG. 8. The procedure shown in FIG. 10 is realized when a CPU of the control section 45 executes a record control program stored in a magnetic disk. FIGS. 8(A) to 8(C) are views each schematically showing the track 100 shown in FIG. 2. The magnetic disk drive 10 is connected via an interface connector 51 to the host computer. The control section 45 is in the state where a record control program is read out from a dedicated area of a magnetic disk 13 into a RAM, and the CPU executes the program. In a block 401 in FIG. 10, a write command, a start address, and user data to be written are transferred from the host computer, and the control section 45 starts a seek operation by sending signals for positioning the head/sliders 33a, 33b, 33c, 33d at a specified cylinder to the power/driver 47 and supplying a power to the voice coil 37.

When the write head is positioned on a track 100 and starts the following operation, the control section 45 starts writing of user data from a header data sector of a data area 135b following a servo sector 133b which is a start address instructed from the host computer. The user data is stored in the buffer memory 53, and then is successively sent to the R/W channel 43. In this step, a cache memory 50 provided in the HDC 49 successively stores therein and then stores and aborts user data for two servo areas just before written. A volume of the user data for two servo areas is equivalent to a memory capacity of data sectors in two data areas, and is 512×6 bytes in this embodiment.

The cache memory 50 repeats storage and abortion of user data just before written in a magnetic disk according to the algorithm of FIFO. More specifically, the control section 45 determines that write to the data area 135a is performed normally unless the control section 45 receives a rewrite signal from the head amplifier control section 217 during the operation for writing user data in the data area 135a. As a result, the cache memory 50 aborts the user data written in the data area 135a, and stores therein user data corresponding to the data area 135c without aborting the user data corresponding to the data area 135b. Similarly, unless a rewrite signal is received, the control section 45 aborts the user data corresponding to the data area 135b, and stores therein user data corresponding to the data area 135d. In the subsequent steps, the cache memory 50 repeats the same operations for storage and abortion during the write operation.

In a block 405, when the magnetic disk rotates in the direction indicated by arrow A and a track reaches the colliding position 141 associated with the write head, the head slider 33a collides with a projection on the magnetic disk. As a result, a vibration signal is generated by a strain gauge 41a and sent via the R/W driver 201 to the vibration output generating section 213. The data sector at the colliding position 141 is described herein as a colliding data sector and the data area 135c including the colliding data sector as an interrupted data area. The vibration output generating section 213 sends an abnormal vibration signal in response to the vibration signal to the write error detecting section 215, and the write error detecting section 215 sends a write interrupt signal to the head amplifier control circuit 217.

When the head amplifier control section 217 sends a rewrite signal to the control section 45 in response to the write interrupt signal, the control section 45 disables the write gate signal in a block 407 to interrupt write operations of the HDC 49, R/W channel 43, and head amplifier 39. A period of time from generation of a vibration signal until start of control for the write operations is extremely shorter as compared to a rotation time of the magnetic disk. Therefore, the magnetic disk drive 10 can interrupt the write operation substantially from the colliding data sector. The data sector at which the magnetic disk drive 10 interrupts the write operation is described herein as an interrupted data sector. After the CPU once disables a write gate signal, the recording control program stores the current state until the process in a block 411. Therefore, even when the vibration output generating section 213 stops output of the abnormal vibration signal, the write operation is not restarted.

The control section 45 controls the HDC 49 to interrupt transfer of the written data to the R/W channel 43 and the cache memory 50 to continue storage of user data corresponding to the data area 135b and interrupted data area 135c. In a block 409, restart of rotation of the magnetic disk is queued in such a state. A line 101 indicates a relative operating direction of the write head relative to a track 100 of the write head for illustrating a positional relation between the magnetic disk and the write head. The write operation is kept in the interrupted state during a period of time indicated by the line 101. Even when the write operation is kept in the interrupted state, the read head reads servo data at a position of each servo sector as with during the write operation, and the control section 45 controls a position of the head support mechanism 31.

In a block 411, while the write operation is kept in the interrupted state and the magnetic disk is rotating, the read head reads a sector address of each servo sector, and the control section 45 recognizes the servo sector 133c that is at the head of the interrupted data area 135c. In this state, in a block 413, the control section 45 enables a write gate signal and controls the HDC 49, R/W channel 43, and head amplifier 39 so that the write operation of the interrupted data is started. As a result, the user data interrupted in the block 415 is written in the prespecified data sector.

A vibration frequency of the head/slider according to the present invention is so high that the vibrations attenuate within an interval for one servo sector, Therefore, the vibrations generated in the colliding data sector substantially cease at a point of time for writing the interrupted user data. The cache memory 50 aborts the user data corresponding to the data area 135b, and starts writing user data corresponding to the interrupted data area 135 from a header data sector of the interrupted data area 135c. In the example shown in FIG. 8(A), the user data has been written from the header data sector of the interrupted data area 135c up to the data sector just before the interrupted data sector, and the user data is overwritten in the section.

In this way, by employing the method in which write data is written, including overwriting, from a header data sector of the interrupted data area 135c, storage and abortion of user data in and from the cache memory 50 can be performed on a data area basis; therefore, control of the operation for writing data can easily be performed. Further, it is difficult to detect a flying height and off-track state of a head/slider in a data area, and therefore it is desirable to write data in the entire interrupted data area from the header data sector of the interrupted data area up to the data sector just ahead the interrupted data sector also for improving the reliability of user data. The line 103 indicates, like the line 101, a direction of movement of the write head relative to the track 100. During the period indicated by the line 103, the user data corresponding to the interrupted data sector indicated by the line 101 is written, and also the user data from the header data section of the interrupted data area 135c up to the data sector just ahead the interrupted data section is overwritten.

The write data transferred from the host computer while the write operation is interrupted is absorbed in the buffer memory 53, and when the buffer memory 53 becomes full of data, the buffer memory 53 at once sends a signal to the host computer to interrupt transfer of the write data. As indicated by the line 103, when the user data, a write operation of which is interrupted, is written up to the data area 135a positioned just ahead the header data area 133b among the data areas in which data is written before interruption of the write operation, the control section 45 changes a recording surface by sending a signal to the head selecting section 211 to switch a write head within the same cylinder, or changes a cylinder by sending a signal to the VCM driver for the purpose of setting a new write space adapted to write the following user data therein.

When the recording method as described above is employed, a strain gauge can detect vibrations of a head/slider with a high frequency generated and then disappearing during passage of a write head over and through one data sector, and interrupt the abnormal write operation. In the method based on the prior art, any abnormality of a flying height is detected at the timing of reading servo data and the subsequent write operation is interrupted. In this embodiment, however, the interrupting operation can be executed for each data sector. Because of this feature, when vibrations occur in the head/slider during a passage of the read head through a data area and disappear before the read head reaches before the timing of reading the next servo data, abnormal write operations cannot be obviated with the conventional technique. In this embodiment, therefore, accurate countermeasures can be performed against the situation as described above, so that reliability of the write operation can be improved. When the projection is large, a rewrite signal is again outputted and the user data, a write operation of which is interrupted, cannot be written in the interrupted data area with the procedure described above, the user data is written in an alternative sector according to the known technology.

FIG. 8(B) is an application of the write operation control shown in FIG. 8(A). Write operation control shown in FIG. 8(B) is different from that shown in FIG. 8(A) in the following point. When a vibration signal is generated, the write operation is interrupted up to the data sector just ahead the interrupted data sector as indicated by a line 101 while the magnetic disk turned once relative to the write head, as indicated by a line 101. Then the write operation is performed from the interrupted data up to the data area 135*a* located just ahead the data area 135*b* at the head of the data area with the user data completely written therein before the interruption as indicated by a line 103. Of the user data to be written in all data sectors in the interrupted data area 135*c* stored in the cache memory 50, the user data corresponding to the data sector just ahead the interrupted data sector is aborted, and only the user data corresponding to the data sectors after the interrupted data sector is transferred via the R/W channel 43 to the write head.

FIG. 8(C) shows another application of the write operation control shown in FIG. 8(A). FIG. 8(C) is different from FIG. 8(A) in the following point. The write operation is interrupted, when a vibration signal is generated, from the interrupted data sector up to the data area 135*a* located just ahead the data area 135*b* at the head of the data area with the user data completely written therein before interruption of writing data as indicated by the line 101. Then the user data is overwritten in all of the data sectors in the data area 135*b* and from the header data sector of the interrupted data area 135*c* to a data sector just ahead the interrupted data sector.

Then, the user data is written in the data sector that has been subjected to interrupted write operation corresponding to the line 101. That is, all of the user data in the area 135*b* is transferred to the track 100. In this method, sometimes user data has been written in most portions of the track 100 at the point of time when the write operation is interrupted. Therefore, a capacity of the cache memory 50 for one track is required. This method is however effective when the reliability of recorded data is required for one track as a whole after a vibration signal is generated.

Another method of recording user data through detection of vibrations of the suspension assembly with a strain gauge in the magnetic disk drive 10 is described below with reference to the flow chart of FIG. 11 and FIG. 9(A). The processing sequence shown in the flow chart in FIG. 11 is realized by allowing the CPU in the control section 45 to execute a recording control program stored in a magnetic disk.

Figure 8:
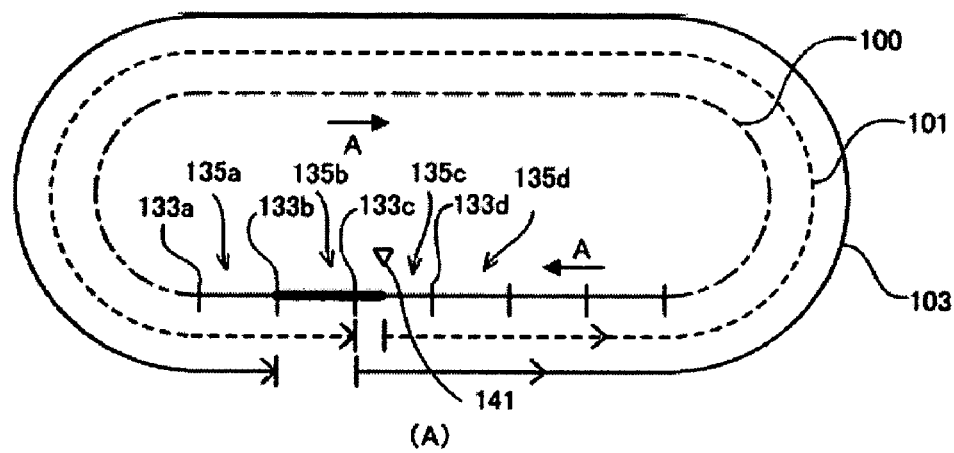
FIG. 8 includes diagrams illustrating a method of writing user data by using a vibration signal from the strain gauge.
Figure 8:
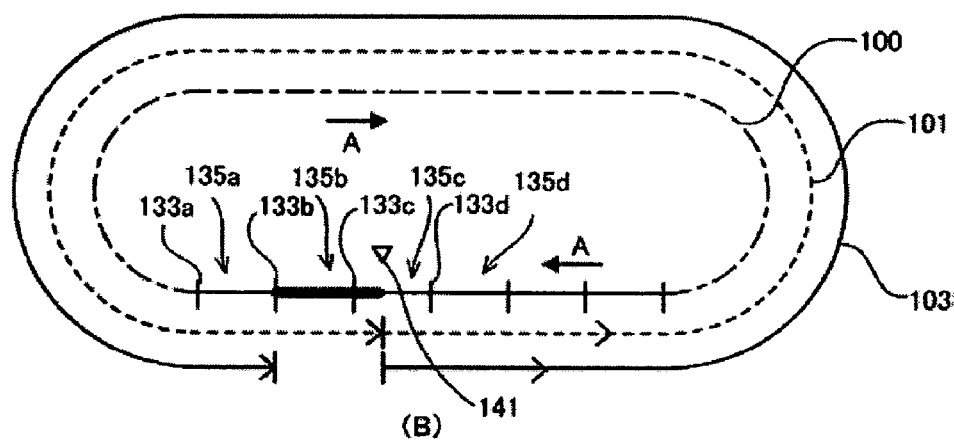
Figure 8:
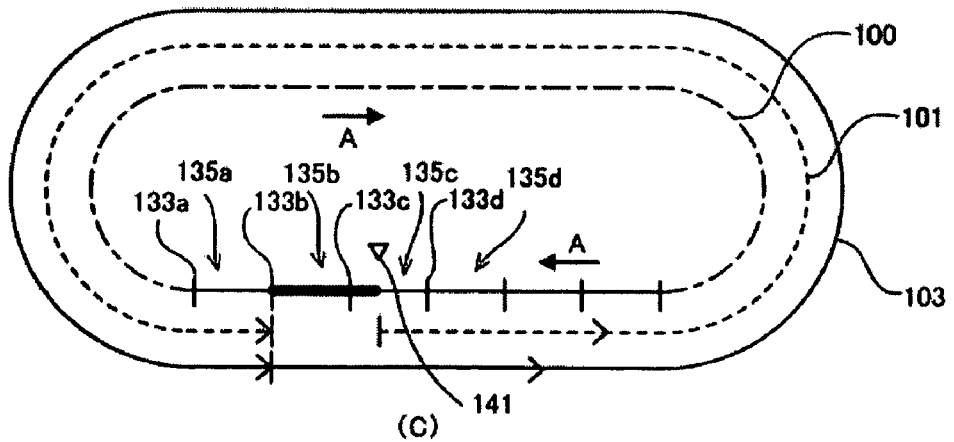
Figure 9:
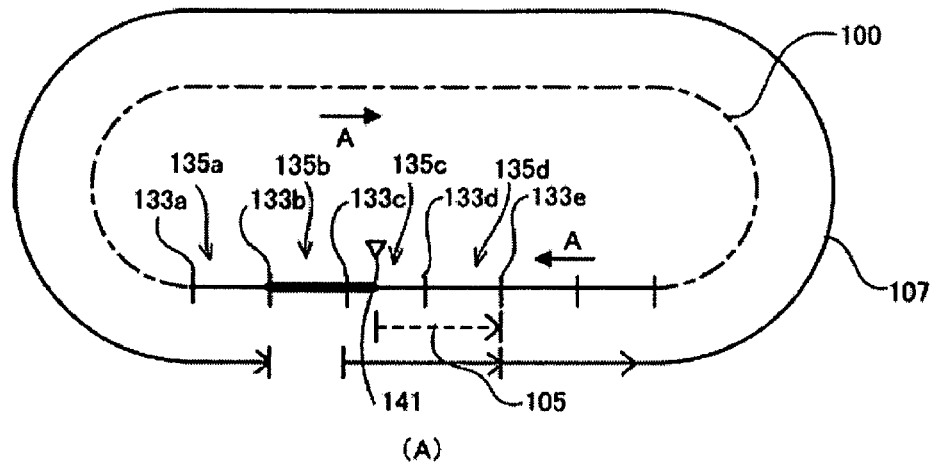
FIG. 9 includes diagrams illustrating a method of writing user data by using a vibration signal from the strain gauge.
Figure 9:
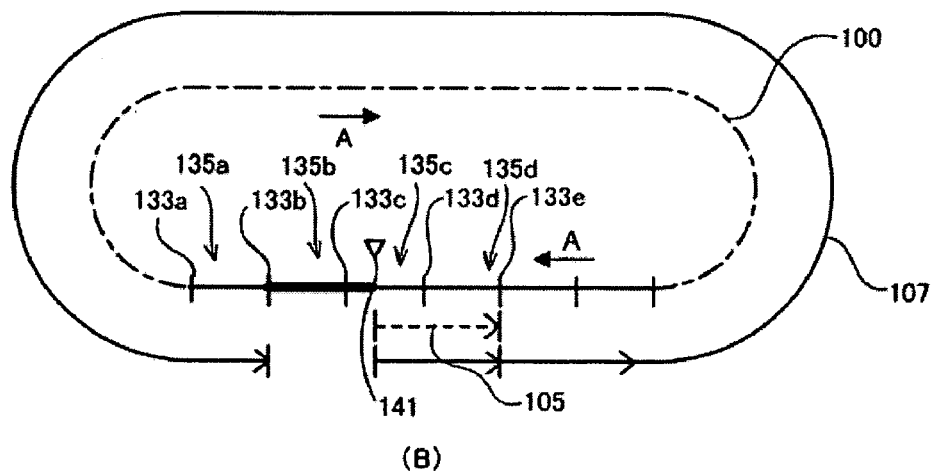
Figure 9:
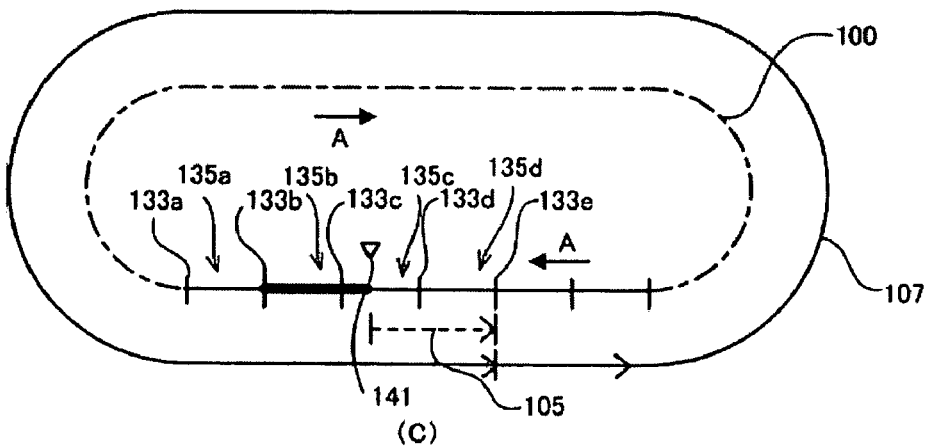

Contents of FIG. 9(A) are substantially the same as those shown in FIG. 8. The writing interruption period indicated by the line 101 in FIG. 8 continues until a point of time immediately before the write head comes to the interrupted data area 135*c*, the interrupted data sector, or the header data area 135*b* with user data written therein before the interruption. In FIGS. 9(A) to 9(C), however, the writing interruption period ends, as indicated by a line 105, at a point of time when two servo sectors selected as a prespecified number of servo sectors pass under the write head after generation of a vibration signal. It is unnecessary that the prespecified number of servo sectors is not limited to two. In this embodiment, a second cache memory having 512×9 bytes for three servo sectors is provided in addition to the cache memory 50.

Figure 11:
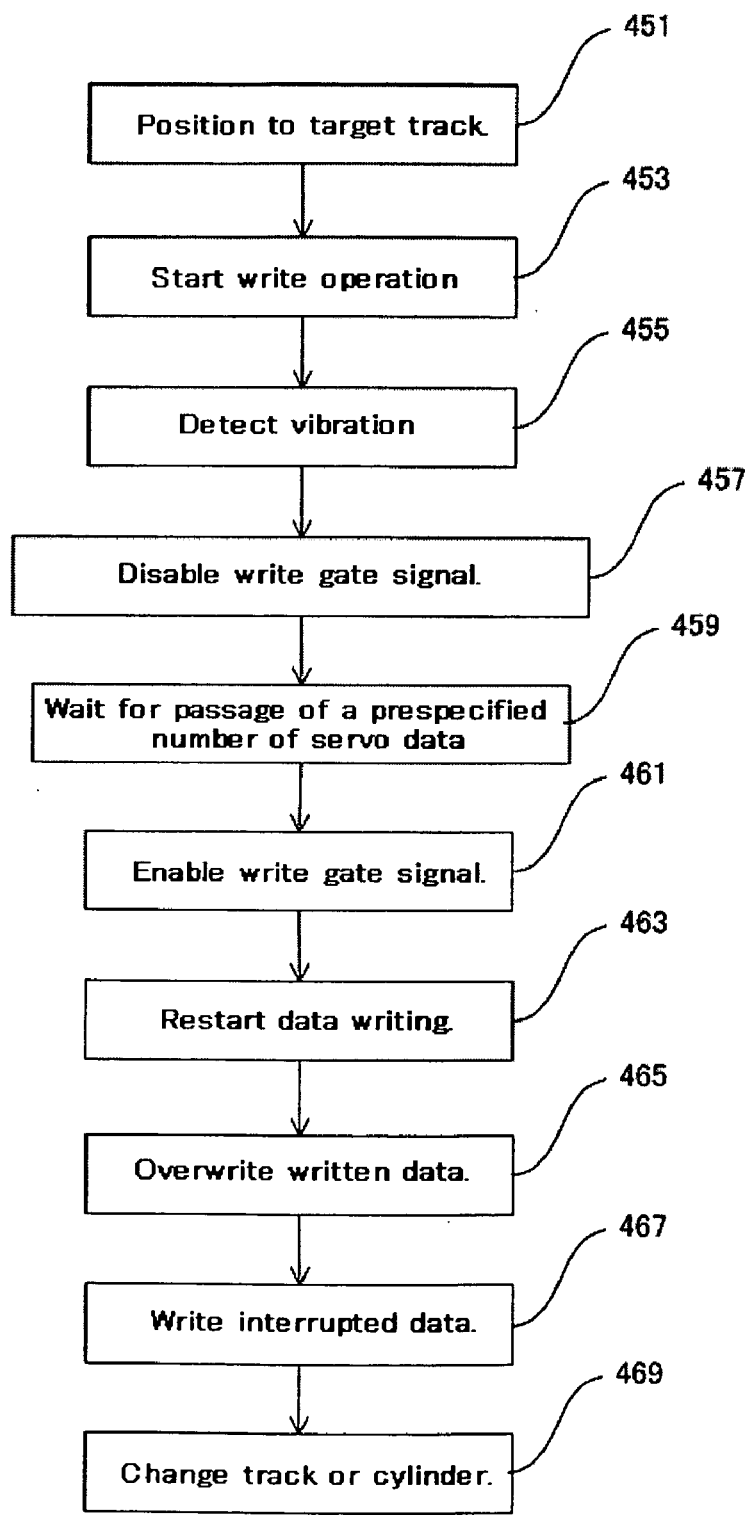
FIG. 11 is a flow chart showing a method of writing user data by using a vibration signal from the strain gauge.
Figure 12:
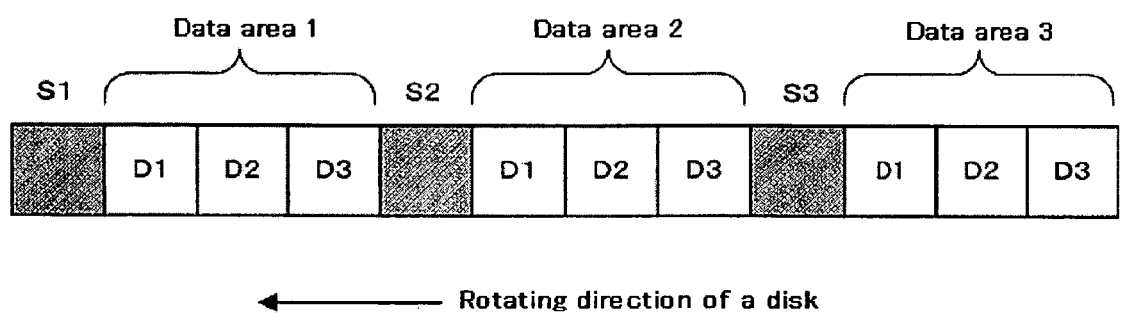
FIG. 12 is a diagram showing a format of one data track based on the data area servo system.

Blocks 451 to 457 and a block 469 in FIG. 11 show the same operations as shown in blocks 401 to 407 and block 417, respectively, and therefore detailed description thereof is omitted herein. In the block 459, the write operation is interrupted at a colliding position 141 until the magnetic disk rotates to the second service sector 133*e* to be read as indicated by the line 105. The user data corresponding to the data area 135*b*, interrupted area 135*c*, and data area 135*d* is stored in the cache memory 50.

Then in the block 461, when the control section 45 recognizes a sector address of the servo sector 133*e*, a write gate signal is enabled to restart the write operation. As indicated by the line 107, writing of user data is started from a data area following the servo sector 133*e* and user data is written up to the data area 135*a*. During this period, if the head amplifier control circuit 217 again sends a rewrite signal to the control section 45, the processing is performed using the cache memory 50 according to the procedure shown in FIG. 10.

In the block 465, the data area 135*b* in which the user data was completely written before interruption of the write operation is skipped, and the user data written in the data sector just ahead the interrupted data sector is overwritten from the header data sector of the interrupted data area 135*c*. In the block 467, user data is written in the data sectors after the interrupted data sector of the interrupted data area 135.

The operation for writing user data in the track 100 started in the data area 135*b* is completed unless interrupted due to collision with any projection before the magnetic disk rotates once. In the method shown in FIG. 8(A) and FIG. 10, however, the magnetic disk is required to rotate twice from a point of time when the operation for writing user data in the track 100 is started in the data area 135, and then interrupted once and then restarted, and is completed to the end. On the other hand, in the method shown in FIGS. 9(A) and 11, the magnetic disk is required to rotate once from a point of time when the write operation in the track 100 is started in the data area 135*b* until a point of time when the write operation is performed up again to the data area 135*b*. However, the write operation is completed by a point of time the write operation is performed up to the data area 135*d* after the interruption, so that the write operation can be interrupted earlier when a vibration signal is generated. However, it is necessary to provide a second cache memory or to perform more complicated control to cope with the situation in which a vibration signal is generated in other data area while user data is being written after interruption of the write operation.

FIG. 9(B) shows a recording method corresponding to that shown in FIG. 8(B), and as indicated by the line 105, the write operation is interrupted when a vibration is generated from the interrupted data sector to the data area 135*d*. Then, as indicated by a line 107, user data is written up to the data area 135*a*, and the interrupted data is written from the interrupted data sector of the interrupted data area 135*c*.

FIG. 9(C) shows a recording method corresponding to that shown in FIG. 8(C), and as indicated by the line 105, the write operation is interrupted from the interrupted-data sector to the data area 135*d* upon generation of a vibration signal. Then, the user data is continuously written to the data area 135*d*. In this step, the user data written in the data area 135 in which writing is finished before interruption and that written from the header data sector of the interrupted data area 135*c* to the data sector just ahead the interrupted data sector are overwritten. As with in the case shown in FIG. 8(C), a capacity of the second cache memory must be sufficient for storing therein user data for one track.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive having a plurality of servo sectors discretely arrayed along a circumferential direction thereof and a plurality of data areas each provided between adjoining servo sectors and including a plurality of data sectors, said magnetic disk drive comprising:
   a head/slider having a write head for writing user data in said data sector formed thereon;
   a head support mechanism including a suspension assembly for supporting said head/slider;
   a vibration sensor attached to said suspension assembly and configured to detect vibrations of the head/slider upon contact with a projection on a disk surface;
   a vibration output generating section configured to generate an abnormal vibration signal based on a vibration signal received from said vibration sensor during a write operation; and
   a control section configured to control said magnetic disk drive so that an operation for writing said user data is interrupted, during the write operation for one track, at a data sector in response to said abnormal vibration signal and then restarted from the data sector at which said write operation has been interrupted when the data sector reaches a position of said write head in association with rotation of said magnetic disk.

2. The magnetic disk drive according to claim 1, wherein said control section controls said magnetic disk drive so that the write operation is interrupted until a point of time immediately before the interrupted data area including said interrupted data sector reaches a position of said write head, and then the user data is overwritten in the data sector of said interrupted data area in which user data was written before interruption of the write operation.

3. The magnetic disk drive according to claim 1, wherein said control section controls said magnetic disk drive so that the write operation is interrupted until a point of time immediately before said interrupted data sector reaches a position of said write head and then the interrupted operation for said user data is restarted from said interrupted data sector.

4. The magnetic disk drive according to claim 1, wherein said control section controls said magnetic disk drive so that the write operation is interrupted until a point of time immediately before a header of the data section in which user data is written before interruption of the write operation reaches a position of said write head and the user data is overwritten in the data sector in which the user data is written before interruption of said write operation.

5. The magnetic disk drive according to claim 1, wherein said control section controls said magnetic disk drive so that an operation for writing said user data is interrupted in response to said abnormal vibration signal until a point of time immediately before a prespecified number of servo sectors from said interrupted data sector pass a position of said write head and then the operation for writing user data following the interrupted user data is restarted from a data sector following said prespecified number of servo sectors.

6. The magnetic disk drive according to claim 5, wherein said control section controls said magnetic disk drive so that, after the user data following said write operation-interrupted user data is written, the user data is overwritten in a data sector of said interrupted data area in which the user data is written before interruption of the write operation, and then the operation for writing said interrupted user data is restarted.

7. The magnetic disk drive according to claim 5, wherein said control section controls said magnetic disk drive so that, after the user data following said write operation-interrupted user data is written, an operation for writing said write operation-interrupted user data is restarted.

8. The magnetic disk drive according to claim 5, wherein said control section controls said magnetic disk drive so that, after the user data following said write operation-interrupted user data is written, the user data is overwritten in the data sector in which said user data was written before interruption of the write operation.

9. The magnetic disk according to claim 1, wherein said vibration output generating section is formed in a semiconductor element in which a head amplifier attached to a head support mechanism is formed.

10. The magnetic disk drive according to claim 1, wherein said vibration sensor is a strain gauge provided on a flexure assembly forming said suspension assembly.

11. The magnetic disk drive according to claim 10, wherein a pattern of said strain gauge is formed on said flexure assembly by means of a pattern printing method or a photolithography method.

12. The magnetic disk drive according to claim 10, wherein a wiring pattern of said write head is formed on a front surface of said flexure assembly facing a recording surface of said magnetic disk, and a pattern of said strain gauge is formed on a rear surface of said flexure assembly.

13. The magnetic disk drive according to claim 10, wherein patterns of said strain gauge are formed with two channels on said flexure assembly and the patterns extend symmetrically along the longitudinal axis of said flexure assembly.

14. A method of recording user data in one track in a magnetic disk drive employing a data area servo system, said method comprising:
   providing a vibration sensor attached to a head support mechanism and being able to detect vibrations of a head/slider upon contact with a projection on a disk surface;
   a first write step of staffing an operation for writing user data in said track;
   generating an abnormal vibration signal in response to said vibration sensor during the write operation in said first write step;
   interrupting the operation for writing said user data in response to said abnormal vibration signal at a sector with the user data currently being written therein and on; and
   a second write step of starting said operation for writing the interrupted user data when said interrupted data sector reaches a position of the write head in association with rotation of the magnetic disk.

15. The method of recording user data in one track in a magnetic disk drive according to claim 14, wherein said interrupting the write operation includes interrupting the write operation until a point of time immediately before the interrupted data area including said interrupted data sector reaches a position of said write head; and said second write step includes overwriting the user data in the data sector of said interrupted data area in which the user data was written before interruption of the write operation.

16. The method of recording user data in one track in a magnetic disk drive according to claim 14, wherein said interrupting the write operation includes interrupting the write operation until a point of time immediately before said interrupted data sector reaches a position of said write head; and said second write step comprises restarting the operation for writing the write operation-interrupted user data from said interrupted data sector.

17. The method of recording user data in one track in a magnetic disk drive according to claim 14, wherein said interrupting the write operation includes interrupting the write operation until a point of time immediately before a header of the data sector, in which the user data was written before interruption of the write operation, reaches a position of said write head; and said second write step includes overwriting the user data in which said user data was written before interruption of the write operation.

18. A method of recording user data in one track in a magnetic disk drive employing a data area servo system, said method comprising:

providing a vibration sensor attached to a head support mechanism and being able to detect vibrations of a head/slider upon contact with a projection on a disk surface;

a first write step of staffing an operation for writing the user data in said track;

generating an abnormal vibration signal in response to said vibration sensor during the write operation in said first write step;

interrupting the operation for writing said user data in response to said abnormal vibration signal until a prespecified number of servo sectors from the interrupted data sector pass a position of said write head;

a second write step of starting the operation for recoding the user data following said write operation-interrupted user data from the data sector following said prespecified number of servo sectors; and a third write step of staffing the operation for writing said write operation-interrupted user data when the write operation-interrupted data sector reaches a position of said write head in association with rotation of the magnetic disk.

19. The method of recording user data in one track in a magnetic disk drive according to claim 18, wherein said third write step includes overwriting user data in the data sector in said interrupted data area in which the user data was write before interruption of the write operation.

20. The method of recording user data in one track in a magnetic disk drive according to claim 18, wherein said third write step includes starting the operation for writing said write operation-interrupted user data from said interrupted data sector.

* * * * *

UNITED STATES PATENT AND TRADEMARK OFFICE
CERTIFICATE OF CORRECTION

PATENT NO.        : 7,362,535 B2           Page 1 of 1
APPLICATION NO. : 11/408540
DATED             : April 22, 2008
INVENTOR(S)       : Toshifumi Kumano It is certified that error appears in the above-identified patent and that said Letters Patent is hereby corrected as shown below:

Claim 14, Column 18, Line 53, please delete "staffing" and insert --starting--.

Claim 18, Column 20, Line 1, please delete "staffing" and insert --starting--.

Claim 18, Column 20, Line 16, please delete "staffing" and insert --starting--.

Signed and Sealed this

Fifteenth Day of July, 2008

JON W. DUDAS
*Director of the United States Patent and Trademark Office*